(12) United States Patent
Ledermann et al.

(10) Patent No.: US 12,535,459 B2
(45) Date of Patent: Jan. 27, 2026

(54) METHOD FOR OPERATING A WIDE-BAND LAMBDA PROBE

(71) Applicant: Robert Bosch GmbH, Stuttgart (DE)

(72) Inventors: Bernhard Ledermann, Weil der Stadt (DE); Hanna Huber, Stuttgart (DE); Ralf Zimmerschied, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 757 days.

(21) Appl. No.: 17/766,360

(22) PCT Filed: Sep. 22, 2020

(86) PCT No.: PCT/EP2020/076374
§ 371 (c)(1),
(2) Date: Apr. 4, 2022

(87) PCT Pub. No.: WO2021/073837
PCT Pub. Date: Apr. 22, 2021

(65) Prior Publication Data
US 2024/0053296 A1    Feb. 15, 2024

(30) Foreign Application Priority Data
Oct. 15, 2019 (DE) .................... 10 2019 215 819.6

(51) Int. Cl.
*G01N 27/417* (2006.01)
*F04B 43/04* (2006.01)
(Continued)

(52) U.S. Cl.
CPC ....... *G01N 27/4175* (2013.01); *F04B 43/043* (2013.01); *G01M 15/10* (2013.01);
(Continued)

(58) Field of Classification Search
CPC ... G01N 27/4175; G01N 27/407–4071; G01N 27/41; G01N 27/4163; G01M 15/10–104
See application file for complete search history.

(56) References Cited

U.S. PATENT DOCUMENTS

2005/0043899 A1    2/2005   Strassner et al.
2010/0243447 A1    9/2010   Fujisaki et al.

FOREIGN PATENT DOCUMENTS

CN           104737011 A    6/2015
DE        102007035318 A1   1/2009
(Continued)

OTHER PUBLICATIONS

International Search Report for PCT/EP2020/076374, Issued Feb. 10, 2021.
(Continued)

*Primary Examiner* — James Lin
*Assistant Examiner* — Vivian A Tran
(74) *Attorney, Agent, or Firm* — Norton Rose Fulbright US LLP

(57) ABSTRACT

A method for operating a wide-band lambda probe. The method includes controlling the Nernst voltage to a predefined setpoint value by setting the pump voltage and/or the pump current, measuring the pump voltage and/or the pump current and/or the lambda value, forming measured value pairs based on measured measuring values of the pump voltage, the pump current and/or the lambda value, calculating a regression line based on the measured value pairs in order to approximate a predefined part of a reference characteristic curve of the pump voltage, and ascertaining a pump current offset and/or lambda offset based on the regression line.

12 Claims, 5 Drawing Sheets

(51) Int. Cl.
*G01M 15/10* (2006.01)
*G01N 27/41* (2006.01)
*G01N 27/416* (2006.01)
*G01N 27/419* (2006.01)

(52) U.S. Cl.
CPC ......... *G01N 27/41* (2013.01); *G01N 27/4163* (2013.01); *G01N 27/419* (2013.01)

(56) References Cited

FOREIGN PATENT DOCUMENTS

| | | | | |
|---|---|---|---|---|
| DE | 102011005694 A1 | 9/2012 | | |
| DE | 102012206140 A1 * | 10/2013 | ......... | G01N 27/4065 |
| DE | 102013221298 A1 | 4/2014 | | |
| DE | 102013202161 A1 | 8/2014 | | |
| DE | 102013202260 A1 | 8/2014 | | |
| DE | 102014007168 A1 | 11/2015 | | |
| EP | 0444674 B1 | 4/1996 | | |
| EP | 2081020 A2 | 7/2009 | | |
| JP | 2003219565 A | 7/2003 | | |

OTHER PUBLICATIONS

Konrad Reif, Sensoren Im Kraftfahrzeug, 1. AUFLAGE 2010 [Sensors in Motor Vehicles, 1st Edition 2010], pp. 160-165 (and including a machine translation).

\* cited by examiner

METHOD FOR OPERATING A WIDE-BAND LAMBDA PROBE

BACKGROUND INFORMATION

A multitude of sensor elements and methods for acquiring at least one property of a measuring gas in a measuring gas chamber are available in the related art. In principle, this may involve any physical and/or chemical properties of the measuring gas, and one or more properties can be acquired. In the following text, the present invention is described in particular with reference to a qualitative and/or quantitative acquisition of a proportion of a gas component of the measuring gas, especially with reference to an acquisition of an oxygen content in the measuring gas. The oxygen content, for instance, is able to be acquired in the form of a partial pressure and/or in the form of a percentage. However, other properties of the measuring gas such as the temperature may also be acquired as an alternative or in addition.

Some conventional sensors have ceramic sensor elements, which are based on the use of electrolytic properties of certain solid-state bodies, that is to say, ion-conducting properties of these solid-state bodies. Such solid-state bodies may especially involve ceramic solid electrolytes such as zirconium dioxide ($ZrO_2$), in particular yttrium-stabilized zirconium dioxide (YSZ) and scandium-doped zirconium dioxide (ScSZ), which may contain small additions of aluminum oxide ($Al_2O_3$) and/or silicon oxide ($SiO_2$).

For example, such sensor elements may be embodied as what is generally known as lambda probes as described, for example, from Konrad Reif (Publ.): Sensoren im Kraftfahrzeug, 1. Auflage 2010 (Sensors in Motor Vehicles, $1^{st}$ edition 2010), pp. 160-165. With the aid of wide-band lambda probes, in particular planar wide-band lambda probes, the oxygen concentration in the exhaust gas, for instance, is able to be determined in a large range and the air-fuel ratio in the combustion chamber be inferred as a result. The excess-air factor $\lambda$ describes this air-fuel ratio.

According to legal requirements in connection with what is known as an onboard diagnosis, the signal of a wide-band lambda probe must be monitored. An error pattern to be monitored is an additive offset, especially in gasoline systems at a stoichiometric combustion ($\lambda=1.0$). This offset is currently identified with the aid of a two-point lambda probe downstream from the catalyst in which, given an active lambda=1 control (upstream and downstream catalyst control is active), the difference of the lambda value of the sensors upstream and downstream from the catalyst is considered an offset of the probe upstream from the catalyst. This requires the existence of a lambda probe in each exhaust tract upstream from the catalyst and a lambda probe downstream from the catalyst.

European Patent No. EP 0 444 674 B1 describes a method which identifies an offset of the wide-band lambda probe upstream from the catalyst without necessitating a second lambda probe downstream from the catalyst as a reference. This may be called a self-adjustment because only signals of the wide-band lambda probe itself are used. Apart from the pump current signal from which the lambda value of the measuring gas is calculated, the pump voltage is additionally evaluated in this method, the pump voltage signal serving as a reference and it being assumed that the pump voltage, in particular at lambda-1.0, is not subject to effects caused by aging or interference. By comparing the pump current and the pump voltage at lambda=1.0, which theoretically corresponds to a pump voltage of approximately 0 mV, a pump current offset and thus also a lambda offset is inferred.

German Patent Application Nos. DE 10 2013 202 161 A1 and DE 10 2013 202 260 A1, describe methods which are likewise based on the pump current and the pump voltage, but which calculate a separate lambda value from both variables, and the difference of these two lambda values is interpreted as the lambda offset of the wide-band lambda probe, the lambda value calculated from the pump voltage serving as a reference.

Despite the advantages of the conventional methods for operating wide-band lambda probes, there is still room for improvement. For example, in the conventional methods, a pump current calculated from the pump voltage or a lambda value is compared directly to the measured pump current or the lambda value calculated therefrom. These methods require a filter to compensate for or average out interference from the measured signals.

SUMMARY

In accordance with the present invention, a method for operating a wide-band lambda probe is provided which avoids the disadvantages of conventional methods at least for the most part, and which particularly makes it possible to identify and possibly adapt an additive offset of a wide-band lambda probe, the method using only signals of the lambda probe itself and requiring no further sensor such as a lambda probe downstream from the catalyst.

In the method according to an example embodiment of the present invention for operating a wide-band lambda probe, which has a ceramic sensor element including an electrochemical pump cell, an electrochemical Nernst cell, a diffusion barrier and a cavity, the cavity communicating via the diffusion barrier with an exhaust gas, and the electrochemical pump cell having an outer pump electrode which is directly exposed to the exhaust gas and an inner pump electrode which is situated in the cavity, and a first solid electrolyte disposed between the outer pump electrode and the inner pump electrode; and the electrochemical Nernst cell has a Nernst electrode, which is situated in the cavity, and a reference electrode, which is situated in a reference gas chamber, and a second solid electrolyte disposed between the Nernst electrode and the reference electrode, and a pump voltage is able to be applied between the outer pump electrode and the inner pump electrode so that a pump current is flowing, and a Nernst voltage is measurable between the Nernst electrode and the reference electrode, and based on the pump current, a lambda value of a measuring gas is able to be acquired, the method including the following steps, preferably in the indicated sequence:

controlling the Nernst voltage to a predefined setpoint value by setting the pump voltage and/or the pump current, measuring the pump voltage, the pump current, and/or the lambda value, forming measured value pairs based on measured measuring values of the pump voltage, the pump current and/or the lambda value, calculating a regression line based on the measured value pairs in order to approximate a predefined part of a reference characteristic curve of the pump voltage, and ascertaining a pump current offset and/or lambda offset based on the regression line.

The predefined part of the reference characteristic curve may be a part having a steep characteristic. In the following text, a steep characteristic may be understood as a characteristic whose gradient exceeds a predefined threshold value, the predefined threshold value differing from zero.

The part having the steep characteristic may be defined by a pump current interval, a lambda interval and/or a pump voltage interval. The part is therefore defined by a lower limit and an upper limit for the pump current, the lambda and/or the pump voltage.

The pump current offset and/or lambda offset is/are able to be ascertained based on a distance of the regression line from the reference characteristic curve of the pump voltage at a predefined point. For instance, the predefined point is a pump current at a pump voltage of 0 mV or a pump current at lambda=1.

In accordance with an example embodiment of the present invention, the method may furthermore include ascertaining a corrected pump current and/or lambda value based on the pump current offset and/or lambda offset. This increases the measuring accuracy.

Alternatively or additionally, the method may furthermore include carrying out a diagnosis of the wide-band lambda probe, in which an error of the wide-band lambda probe is identified if the pump current offset and/or lambda offset exceed(s) a first predefined threshold value or drop(s) below a second predefined threshold value that differs from the first predefined threshold value. The pump current offset and/or lambda offset is/are therefore able to be used as a diagnosis criterion for carrying out a self-adjustment that corresponds to the legally required onboard diagnosis.

The regression line is able to be calculated using the method of least squares. The calculation method of least squares is able to be implemented recursively. By forming the regression line, interference in the measured signals is able to be implicitly compensated for or averaged out from the measured signals so that no further filter is required. In addition, the regression line may be ascertained by the linear method of least squares, which is also implementable recursively so that the memory and computing requirement, e.g., in an engine control unit, is low.

The measured value pairs may include a measured pump voltage Up as a function of pump current Ip, a measured pump current Ip as a function of the pump voltage, a measured pump voltage as a function of lambda or a measured lambda as a function of pump voltage Up. In other words, a regression line is calculated from multiple measured values, e.g., the measured pump voltage Up as a function of pump current Ip or vice versa, or the measured pump voltage as a function of lambda or vice versa.

Moreover, a computer program is provided, which is designed to carry out each step of the present method as described in one of the above embodiments.

In addition, an electronic memory medium is provided on which such a computer program is stored.

In addition, an electronic control unit is provided, which includes such an electronic memory medium.

A basic feature of the present invention is that the pump voltage continues to serve as a reference, but that a pump current or lambda value calculated from the pump voltage is not directly compared to the measured pump current or the lambda value calculated therefrom; instead, a regression line is first calculated from multiple measured values. The regression line is meant to map the steep part of a characteristic curve typical of a wide-band lambda probe. The distance of this regression line from a nominal sensor characteristic curve at a typical point is then able to be interpreted as an offset of the wide-band lambda probe.

One advantage of the present invention is that the formation of the regression line makes it possible to implicitly compensate for or average out interference from the measured signals so that no further filter is required. In addition, the regression line is able to be ascertained with the aid of the method of least squares, which may also be implemented recursively so that the memory and computing requirement, e.g., in an engine control unit, is low.

The present method is furthermore able to be applied to variables on the basis of a pump current or lambda. Depending on the specification of the wide-band lambda probe, the regression line of the pump voltage=f(pump current) or the pump voltage=f(lambda) is thereby able to be calculated and compared to the nominal characteristic curve specified on the same basis.

Since the comparison point of the regression line and the nominal characteristic curve is freely selectable, e.g., pump voltage=0 mV or pump voltage at $\lambda$=1, it is advantageously able to be placed on a well-specifiable and stable point of the characteristic curve of the wide-band lambda probe.

BRIEF DESCRIPTION OF THE DRAWINGS

Further optional details and features of the present invention result from the following description of preferred exemplary embodiments, which are schematically shown in the figures.

DETAILED DESCRIPTION OF EXAMPLE EMBODIMENTS

Figure 1:
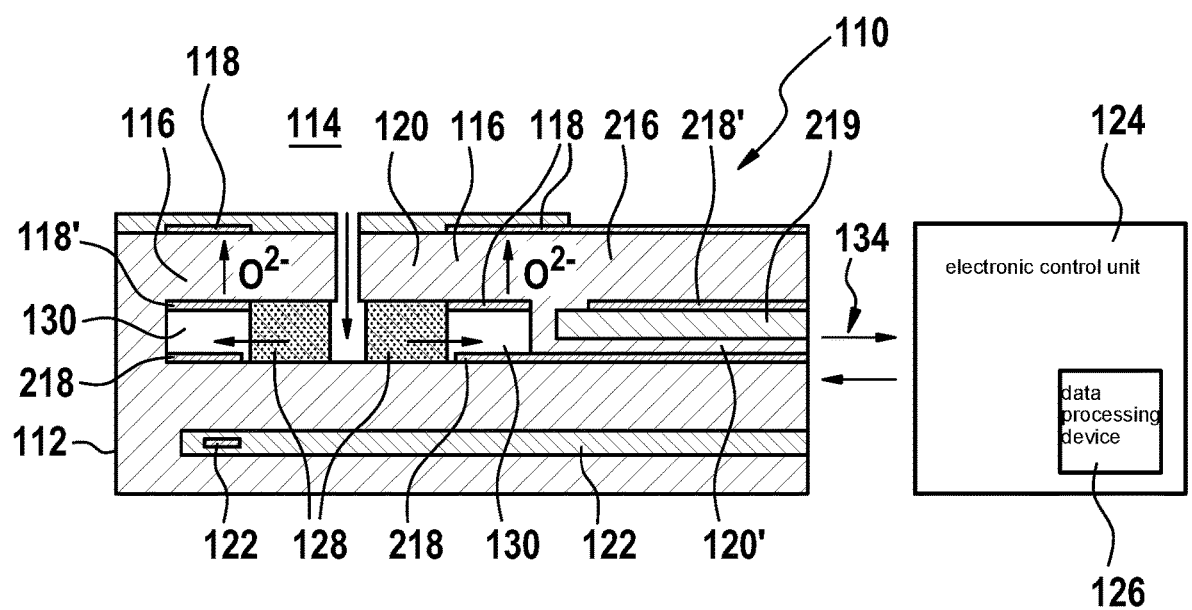
FIG. 1 shows a cross-sectional view of a wide-band lambda probe.
Figure 2:
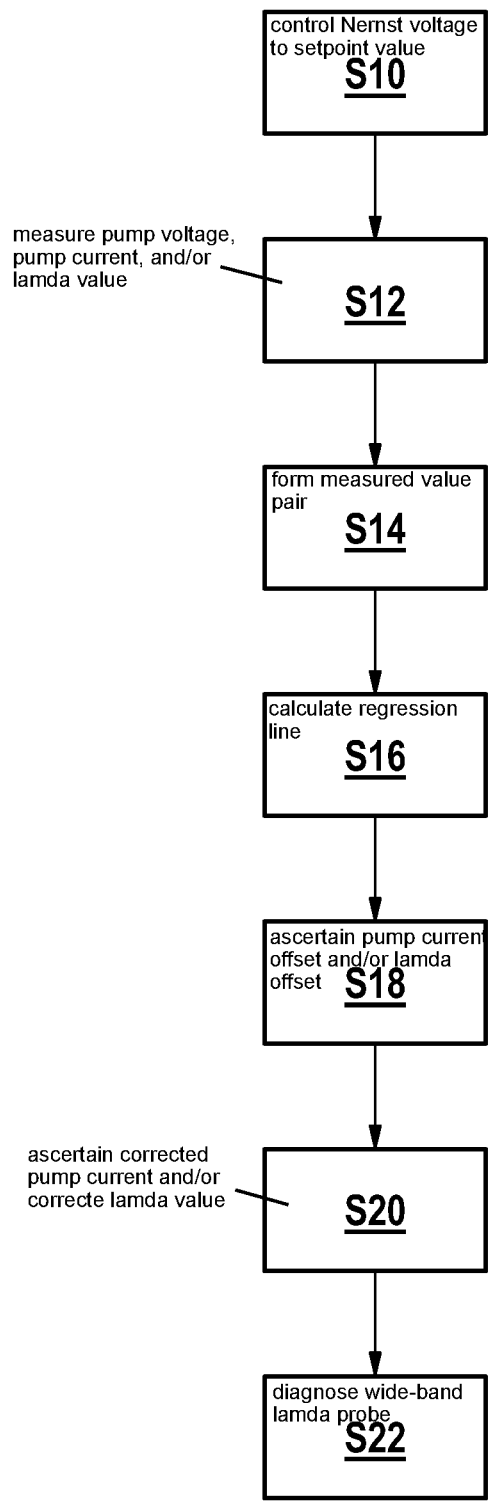
FIG. 2 shows a flow diagram of the method of the present invention by way of an example embodiment.

FIG. 1 shows a cross-sectional view of a wide-band lambda probe 110. Wide-band lambda probe 110 is connected to an electronic control unit 124. Wide-band lambda probe 110 includes a sensor element 112. Sensor element 112 has an electrochemical pump cell 116 having an outer pump electrode 118 and an inner pump electrode 118' and an interposed solid electrolyte 120. Outer pump electrode 118 is directly exposed to a measuring gas 114, e.g., exhaust gas, separated only by a protection layer, and inner pump electrode 118' is situated in an inner cavity 130 of sensor element 112. The access of the gas to cavity 130 or to electrode 118 disposed therein is restricted by a porous diffusion barrier 128.

Sensor element 112 has an electrochemical Nernst cell 216 including a Nernst electrode 218 and a reference electrode 218' disposed in a reference channel 219, which are connected to one another by second solid electrolyte 120'. Sensor element 112 furthermore includes a heating element 122 developed as an electrical resistive heater.

Electronic control unit 124 is designed to carry out the method for operating the wide-band lambda probe according to the present invention, in particular for realizing an activatable and/or deactivatable external electric circuitry by which electric voltages and/or electric currents are able to be injected into electrochemical pump cell 116, electrochemical Nernst cell 216 and/or heating element 122. In addition, control unit 124 may be configured to determine a temperature of sensor element 112 and/or electrochemical pump cell 116 and/or electrochemical Nernst cell 216, e.g., by corresponding resistance measurements or the like. For this purpose, electronic control unit 124 may include at least one data processing device 126. In addition, electronic control unit 124 may have an electronic memory medium on which a computer program is stored that includes instruction for carrying out the individual method steps. Sensor element 112 may be connected via at least one interface 134 to electronic control unit 124 and/or data processing device 126. In particular, a pump voltage Up is able to be applied between outer pump electrode 118 and inner pump electrode 118' so that a pump current Ip is flowing, and a Nernst voltage Un is measurable between Nernst electrode 218 and reference electrode 218'.

The method according to the present invention is described in the following text. The operation of lambda probe 110 begins once sensor element 112 has been sufficiently heated, for instance after an operating temperature of between 700° C. and 800° C. has been adjusted with the aid of electrical resistance heater. Thereafter, the temperature of sensor element 112 and thus the internal resistance of electrochemical cells 116, 216, continues to be controlled to always this temperature.

During the operation of the wide-band lambda probe, Nernst voltage Un is controlled to a predefined setpoint value at all times, e.g., 450 mV, as indicated in step S10. To this end, pump voltage Up and/or pump current Ip is/are appropriately adjusted by a control algorithm. Thus, a gas mixture having a predefined excess-air factor, e.g., lambda=1, is adjusted in interior cavity 130. This pump current Ip physically flows as an ion flow in electrochemical pump cell 116 and as an electron flow in its supply line and basically is already a measure of the partial pressure of the oxygen in measuring gas 114 such as exhaust gas, i.e., for lambda. Based on pump current Ip, a lambda value of measuring gas 114 can therefore be acquired. The basis for the adjustment of the voltage at what are termed Nernst cells is the chemical potential. However, this has to be indicated relative to a defined fixed potential. In a normal case, a clearly defined chemical potential exists within lambda probe 110 at the RE terminal of the lambda probe where the so-called air reference is located. All further potentials of the lambda sensor relate to this air reference, including the potential at the IPE pin where what is termed the lambda−1 cavity 130 is located whose chemical potential is adjusted via a differential voltage of 450 mV in such a way that the lambda value of 1 comes about there. Pump voltage Up mentioned so far is the voltage of the APE pin relative to the IPE pin. However, since the IPE pin relates to a potential at the RE pin, it would be possible in the present method to replace the use of pump voltage Up with the use of the voltage between the APE pin and RE pin, which in this case may be referred to as a sensor-internal signal of a binary lambda probe.

In step S12, the pump voltage Up, pump current Ip and/or the lambda value of the measuring gas is/are measured, e.g., acquired. The measured values thus acquired are stored at least intermittently.

In step S14, measured value pairs are formed based on the measured measuring values of pump voltage Up, pump current Ip and/or the lambda value of the measuring gas.

In step S16, based on the measured value pairs, a regression line is calculated to approximate a predefined part of a reference characteristic curve of pump voltage Up. In this way a regression line is calculated with the aid of multiple measured value pairs, e.g., measured pump voltage Up as a function of pump current Ip or vice versa or measured pump voltage Up as a function of lambda A or vice versa. The predefined part of the reference characteristic line can be a part having a steep characteristic, that is to say, a part having a gradient that is considerably greater, i.e., at least by a factor of 3 and preferably at least by a factor of 5, for instance, than in the other parts of the characteristic curve. Such a steep characteristic is typical of lambda probes. The regression line thus is meant to map the steep part of a function Up=f(Ip) or Up=f(λ) typical of the wide-band lambda probe. The part having the steep characteristic may be defined by a pump current interval, a lambda interval and/or a pump voltage interval. In other words, the steep part is able to be defined with the aid of the specified nominal characteristic curve by a pump current interval or lambda interval and/or a pump voltage interval.

To estimate the regression line, it is possible, for one, to initially buffer-store measured value pairs from the defined Up/Ip or Up/λ interval and then to carry out a linear regression using the method of least squares in a computing step. As an alternative, the calculation may also be carried out recursively, which reduces the memory and computing requirements. In this context, it is possible to calculate Up both as a function of Ip or A or also the inverse relationship, depending on which variable is viewed as including more noise. This is because the method of least squares is based on the assumption that only the dependent variable (Y axis) has interference. However, since both the pump voltage and the pump current or lambda are measured here and thus include interference, it is advantageously also possible to use the total least squares method, which is able to take interference both on the X-axis and the Y-axis into account in the parameter estimate.

In step S18, based on the regression line, a pump current offset and/or lambda offset is/are ascertained. More specifically, the pump current offset and/or a lambda offset is/are ascertained based on a distance of the regression line from the reference characteristic curve of the pump voltage at a predefined point. For example, the predefined point is a pump current at a pump voltage of 0 mV or a pump current at lambda=1. In other words, the distance of this regression line from a nominal sensor characteristic curve at a typical point, e.g., a horizontal distance of the regression line from a nominal sensor characteristic curve Up=f(Ip) at Up=0 mV or Up at λ=1, is then able to be interpreted as an offset, e.g., a pump current or lambda offset.

In step S20, based on the pump current offset and/or lambda offset, a corrected pump current and/or lambda value is/are ascertained, for instance by subtraction or addition of the measured pump current Ip or lambda. The pump current offset or lambda offset ascertained by this method may thus be directly used for an adaptation and correction of the faulty pump current signal or lambda signal.

In addition, a diagnosis of wide-band lambda probe 110 is optionally able to be performed in step S22, and an error of wide-band lambda probe 110 is identified if the pump current offset and/or the lambda offset exceed(s) a first predefined threshold value or drop(s) below a second predefined threshold value that differs from the first predefined threshold value. In addition, the pump current offset thus identified may furthermore be used for a diagnosis of wide-band lambda probe 110 in that an error entry is made if the identified pump current offset or lambda offset is greater or smaller than specified threshold values.

The use of the present invention can be demonstrated if an error is detected, for instance in the introduction of a leakage current or an incoupling to the pump current. This will then be entered by the control unit and be made measurable via the diagnosis interface.

Figure 3:
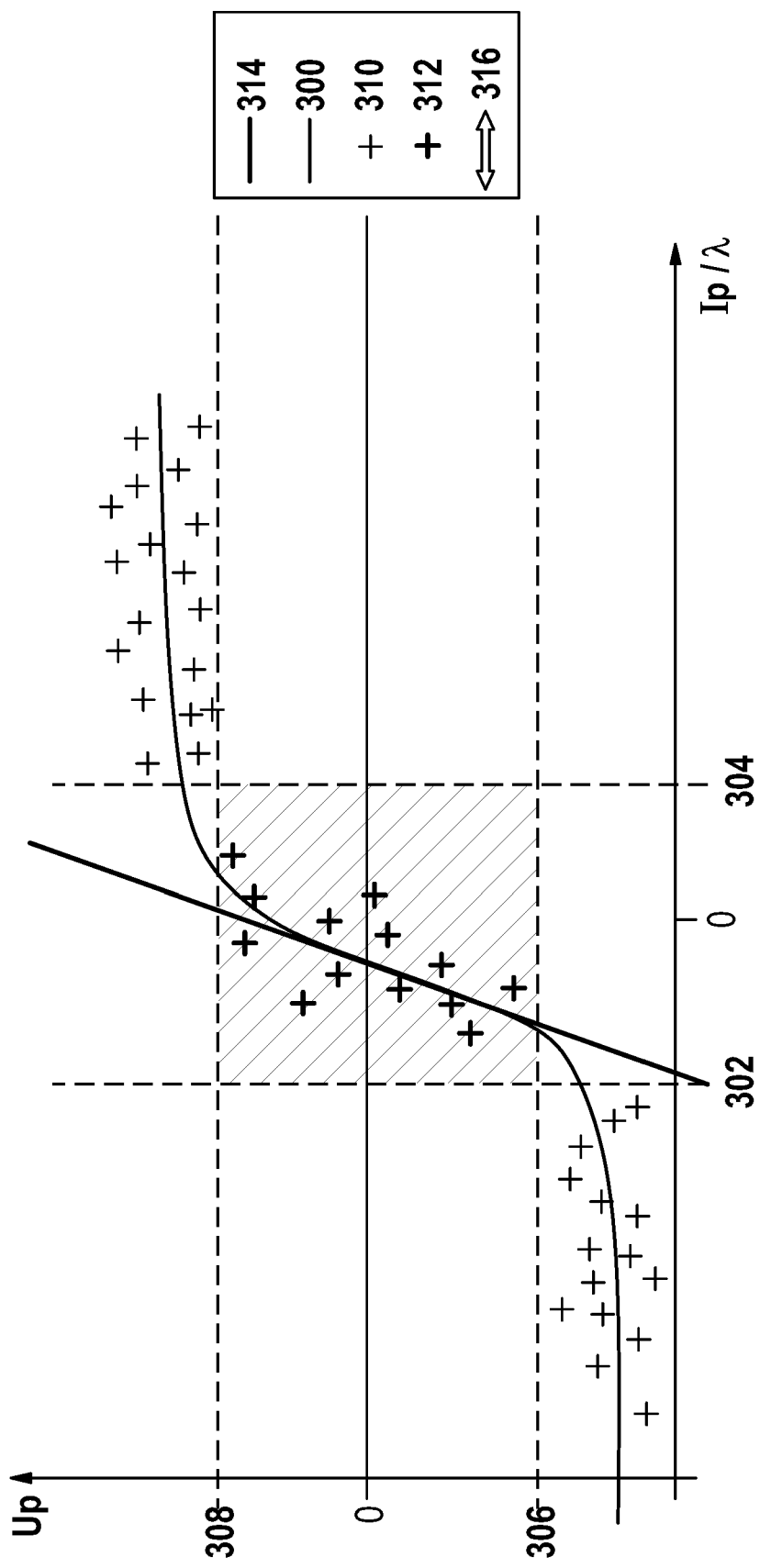
FIG. 3 shows a result of the present method for a new wide-band lambda probe without offset.

FIG. 3 shows a result of the method with a new wide-band lambda probe without offset. In the illustrated example, the measured pump current Ip or the measured lambda is plotted on the X-axis. Plotted on the Y-axis is pump voltage Up as a function thereof. In addition, the characteristic of an exemplary reference characteristic curve 300 of the new wide-band lambda probe is shown. The steep part of reference characteristic curve 300 is defined by a pump current interval or lambda interval having a lower limit 302 and an upper limit 304 and by a pump voltage interval having a lower limit 306 and an upper limit 308. The respective measured values 310, 312 for the measured pump current Ip or lambda are shown as well. Measured values outside the pump current or lambda interval and pump voltage interval are denoted by 310, and measured values inside the pump current or lambda interval and pump voltage interval are denoted by 312. Also shown is regression line 314 calculated in this manner. Since the example in FIG. 3 involves a new wide-band lambda probe without offset, a horizontal distance 316 of regression line 314 from reference characteristic curve 300 at a predefined point inside the part having a steep characteristic, e.g., at a pump voltage Up=0 mV, is likewise zero, which indicates no offset.

Figure 4:
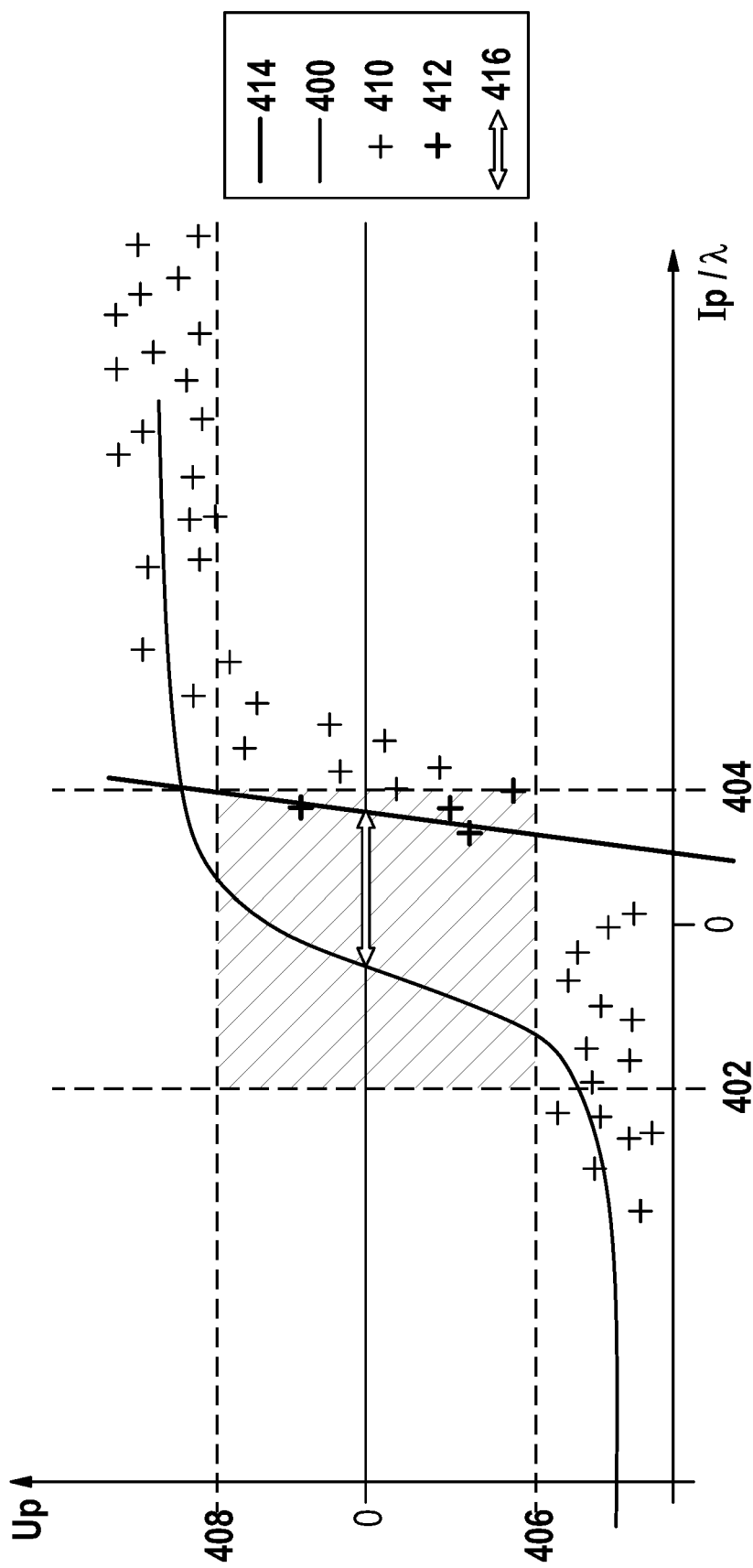
FIG. 4 shows a result of the present method for a new wide-band lambda probe featuring an offset.

FIG. 4 shows a result of the method in a new wide-band lambda probe with an offset. In the illustrated example, measured pump current Ip or the measured lambda is plotted on the X-axis. Plotted on the Y-axis is pump voltage Up as a function thereof. In addition, the characteristic of an exemplary reference characteristic curve 400 of the new wide-band lambda probe is shown. The steep part of reference characteristic curve 400 is defined by a pump current interval or lambda interval having a lower limit 402 and an upper limit 404, and by a pump voltage interval having a lower limit 406 and an upper limit 408. The respective measured values 410, 412 for the measured pump current Ip or lambda are also shown. Measured values outside the pump current or lambda interval and the pump voltage interval are denoted by 410, and measured values inside the pump current or lambda interval and pump voltage interval are denoted by 412. Regression line 414 calculated in this way is also shown. Since the example in FIG. 4 relates to a new wide-band lambda probe with an offset, a horizontal distance 416 of regression line 414 from reference characteristic curve 400 at a predefined point inside the part having the steep characteristic, such as at a pump voltage Up=0V, for example, differs from zero, which indicates an offset.

Figure 5:
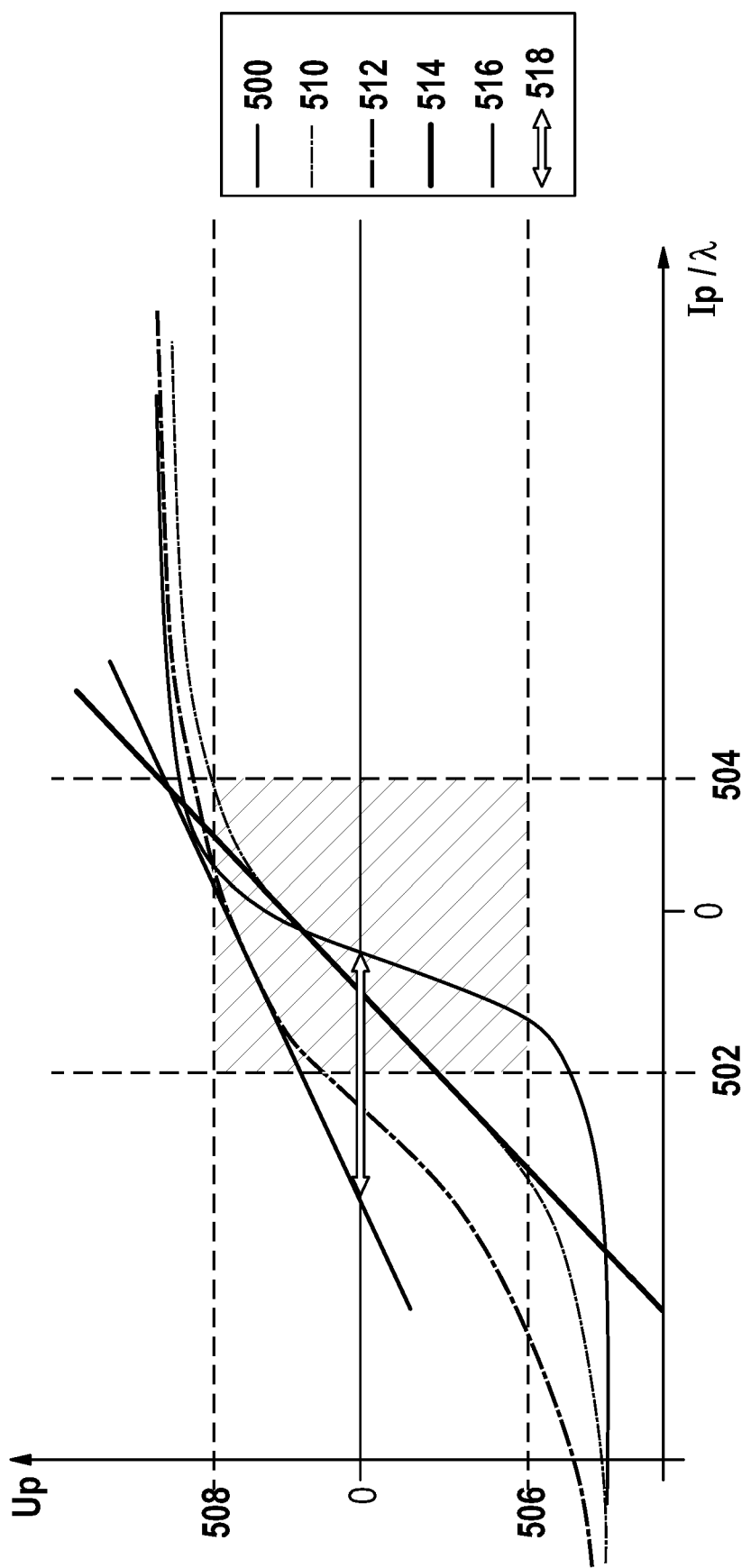
FIG. 5 shows a result of the present method in aged wide-band lambda probes featuring an offset.

FIG. 5 shows a result of the method in aged wide-band lambda probes having an offset. In the illustrated example, measured pump current Ip or the measured lambda is plotted on the X-axis. Plotted on the Y-axis is pump voltage Up as a function thereof. In addition, the characteristic of an exemplary reference characteristic curve 500 in a new wide-band lambda probe is shown. The steep part of reference characteristic curve 500 is defined by a pump current interval or lambda interval having a lower limit 502 and an upper limit 504 and by a pump voltage interval having a lower limit 506 and an upper limit 508. In addition, a first characteristic 510 of pump voltage Up as a function of Ip or lambda of a first aged wide-band lambda probe and a second characteristic 512 of pump voltage Up as a function of Ip or lambda are shown. A calculated first regression line 514 of first aged wide-band lambda probe and a calculated second regression line 516 of the second aged wide-band lambda probe are also shown. Since the example in FIG. 5 relates to aged wide-band lambda probes including an offset, a horizontal distance 518 from, for instance, second regression line 516 of reference characteristic line 500 at a predefined point inside the part having the steep characteristic, e.g., at a pump voltage Up=0 mV, differs from zero, which indicates an offset.

What is claimed is:

1. A method for operating a wide-band lambda probe, the wide-band lambda probe having a ceramic sensor element which includes an electrochemical pump cell, an electrochemical Nernst cell, a diffusion barrier, and a cavity, the cavity communicating via the diffusion barrier with an exhaust gas, and the electrochemical pump cell having an outer pump electrode which is directly exposed to the exhaust gas and an inner pump electrode which is situated inside the cavity, and a first solid electrolyte disposed between the outer pump electrode and the inner pump electrode, the electrochemical Nernst cell has a Nernst electrode, which is disposed in the cavity, and a reference electrode, which is situated in a reference gas chamber, and a second solid electrolyte situated between the Nernst electrode and the reference electrode, and a pump voltage is able to be applied between the outer pump electrode and the inner pump electrode so that a pump current is flowing, and a Nernst voltage is measurable between the Nernst electrode and the reference electrode, and based on the pump current, a lambda value of a measuring gas is able to be acquired, the method comprising the following steps:
  controlling the Nernst voltage to a predefined setpoint value by setting the pump voltage and/or the pump current;
  measuring the pump voltage and/or the pump current and/or the lambda value;
  forming measured value pairs based on measured values of the pump voltage and/or the pump current and/or the lambda value; and
  calculating a regression line based on the measured value pairs, the regression line approximating a predefined part of a reference characteristic curve of the pump voltage;
  ascertaining a pump current offset and/or lambda offset based on the regression line; and
  correcting the pump current and/or the lambda value based on the pump current offset and/or the lambda offset to adjust further measurements from the wide-band lambda probe.

2. The method as recited in claim 1, wherein the predefined part of the reference characteristic curve is a part having a steep characteristic.

3. The method as recited in claim 2, wherein the part having the steep characteristic is defined by a pump current interval and/or a lambda interval and/or a pump voltage interval.

4. The method as recited in claim 1, further comprising:
  ascertaining the pump current offset and/or lambda offset based on a distance of the regression line from the reference characteristic curve of the pump voltage at a predefined point.

5. The method as recited in claim 4, wherein the predefined point is a pump current at a pump voltage of 0 mV or a pump current at lambda=1.

6. The method as recited in claim 1, further comprising:
  ascertaining the corrected pump current and/or lambda value based on the pump current offset and/or the lambda offset.

7. The method as recited in claim 1, further comprising:
  carrying out a diagnosis of the wide-band lambda probe, wherein an error of the wide-band lambda probe is identified when the pump current offset and/or the lambda offset exceeds a first predefined threshold value, or when the pump current offset and/or the lambda offset drops below a second predefined threshold value that differs from the first predefined threshold value.

8. The method as recited in claim 1, wherein the regression line is calculated according to a method of least squares.

9. The method as recited in claim 8, wherein the method of least squares is implemented in a recursive manner.

10. The method as recited in claim 1, wherein the measured value pairs include: the measured pump voltage as a function of the pump current, or the measured pump current as a function of the pump voltage, or the measured pump voltage as a function of the lambda value, or the measured lambda value as a function of the pump voltage.

11. A non-transitory electronic memory medium on which is stored a computer program for operating a wide-band lambda probe, the wide-band lambda probe having a ceramic sensor element which includes an electrochemical pump cell, an electrochemical Nernst cell, a diffusion barrier, and a cavity, the cavity communicating via the diffusion barrier with an exhaust gas, and the electrochemical pump cell having an outer pump electrode which is directly exposed to the exhaust gas and an inner pump electrode which is situated inside the cavity, and a first solid electrolyte disposed between the outer pump electrode and the inner pump electrode, the electrochemical Nernst cell has a Nernst electrode, which is disposed in the cavity, and a reference electrode, which is situated in a reference gas chamber, and a second solid electrolyte situated between the Nernst electrode and the reference electrode, and a pump voltage is able to be applied between the outer pump electrode and the inner pump electrode so that a pump current is flowing, and a Nernst voltage is measurable between the Nernst electrode and the reference electrode, and based on the pump current, a lambda value of a measuring gas is able to be acquired, the computer program, when executed by computer, causing the computer to perform the following steps:

controlling the Nernst voltage to a predefined setpoint value by setting the pump voltage and/or the pump current;

measuring the pump voltage and/or the pump current and/or the lambda value;

forming measured value pairs based on measured values of the pump voltage and/or the pump current and/or the lambda value; and calculating a regression line based on the measured value pairs, the regression line approximating a predefined part of a reference characteristic curve of the pump voltage;

ascertaining a pump current offset and/or lambda offset based on the regression line; and correcting the pump current and/or the lambda value based on the pump current offset and/or the lambda offset to adjust further measurements from the wide-band lambda probe.

12. An electronic control unit configured to operate a wide-band lambda probe, the wide-band lambda probe having a ceramic sensor element which includes an electrochemical pump cell, an electrochemical Nernst cell, a diffusion barrier, and a cavity, the cavity communicating via the diffusion barrier with an exhaust gas, and the electrochemical pump cell having an outer pump electrode which is directly exposed to the exhaust gas and an inner pump electrode which is situated inside the cavity, and a first solid electrolyte disposed between the outer pump electrode and the inner pump electrode, the electrochemical Nernst cell has a Nernst electrode, which is disposed in the cavity, and a reference electrode, which is situated in a reference gas chamber, and a second solid electrolyte situated between the Nernst electrode and the reference electrode, and a pump voltage is able to be applied between the outer pump electrode and the inner pump electrode so that a pump current is flowing, and a Nernst voltage is measurable between the Nernst electrode and the reference electrode, and based on the pump current, a lambda value of a measuring gas is able to be acquired, the electronic control unit configured to:

control the Nernst voltage to a predefined setpoint value by setting the pump voltage and/or the pump current;

measure the pump voltage and/or the pump current and/or the lambda value;

form measured value pairs based on measured values of the pump voltage and/or the pump current and/or the lambda value; and calculate a regression line based on the measured value pairs, the regression line approximating a predefined part of a reference characteristic curve of the pump voltage;

ascertain a pump current offset and/or lambda offset based on the regression line; and correcting the pump current and/or the lambda value based on the pump current offset and/or the lambda offset to adjust further measurements from the wide-band lambda probe.

\* \* \* \* \*